US009637381B2

(12) United States Patent
Bittencourt et al.

(10) Patent No.: US 9,637,381 B2
(45) Date of Patent: May 2, 2017

(54) PROCESS FOR PRE-REFORMING HYDROCARBON STREAMS CONTAINING OLEFINS, PRE-REFORMING CATALYST AND A PROCESS FOR PREPARING SAID CATALYST

(71) Applicant: PETROLEO BRASILEIRO S.A.—PETROBRAS, Rio de Janeiro (BR)

(72) Inventors: Roberto Carlos Pontes Bittencourt, Rio de Janeiro (BR); Antonio Marcos Fonseca Bidart, Rio de Janeiro (BR); Fabio Menezes Passarelli, Rio de Janeiro (BR)

(73) Assignee: PETROLEO BRASILEIRO S.A.—PETROBRAS, Rio de Janeiro (BR)

( * ) Notice: Subject to any disclaimer, the term of this patent is extended or adjusted under 35 U.S.C. 154(b) by 0 days.

(21) Appl. No.: 14/649,596

(22) PCT Filed: May 16, 2014

(86) PCT No.: PCT/BR2014/000162
§ 371 (c)(1),
(2) Date: Jun. 4, 2015

(87) PCT Pub. No.: WO2014/205530
PCT Pub. Date: Dec. 31, 2014

(65) Prior Publication Data
US 2015/0315019 A1 Nov. 5, 2015

(30) Foreign Application Priority Data
Jun. 24, 2013 (BR) .......................... 10 2013 016055

(51) Int. Cl.
*C01B 3/40* (2006.01)
*B01J 23/02* (2006.01)
(Continued)

(52) U.S. Cl.
CPC ................. *C01B 3/40* (2013.01); *B01J 21/04* (2013.01); *B01J 23/02* (2013.01); *B01J 23/83* (2013.01);
(Continued)

(58) Field of Classification Search
None
See application file for complete search history.

(56) References Cited

U.S. PATENT DOCUMENTS 3,481,722 A 12/1969 Pfefferle
4,060,498 A 11/1977 Kawagoshi et al.
(Continued)

FOREIGN PATENT DOCUMENTS

BR PI 1000656-7 A2 10/2011
BR PI 1107073-0 A2 10/2013
CN 102527405 A 7/2012

OTHER PUBLICATIONS

International Search Report of PCT/BR2014/000162, dated Jun. 24, 2014. [PCT/ISA/210].

*Primary Examiner* — Melvin C Mayes
*Assistant Examiner* — Kenneth Vaden
(74) *Attorney, Agent, or Firm* — Sughrue Mion, PLLC

(57) ABSTRACT

The present invention relates to a catalyst for steam pre-reforming of hydrocarbons, containing in its formulation nickel and rare earths supported on alumina or magnesium or calcium aluminates, so as to increase the resistance to coke deposition, and the process for preparing said catalyst. Additionally the present invention relates to a process for manufacturing hydrogen or syn gas through steam pre-
(Continued)

reforming olefin-containing hydrocarbons in the presence of the catalyst obtained according to the present invention.

10 Claims, 3 Drawing Sheets

(51) Int. Cl.
    *B01J 21/04*     (2006.01)
    *B01J 35/00*     (2006.01)
    *B01J 37/02*     (2006.01)
    *B01J 37/08*     (2006.01)
    *B01J 37/18*     (2006.01)
    *B01J 23/83*     (2006.01)
    *C01B 3/32*     (2006.01)

(52) U.S. Cl.
    CPC ....... *B01J 35/0006* (2013.01); *B01J 37/0201* (2013.01); *B01J 37/0236* (2013.01); *B01J 37/08* (2013.01); *B01J 37/18* (2013.01); *C01B 3/32* (2013.01); *B01J 2523/00* (2013.01); *C01B 2203/0233* (2013.01); *C01B 2203/1058* (2013.01); *C01B 2203/1082* (2013.01); *C01B 2203/1235* (2013.01); *C01B 2203/1247* (2013.01); *C01B 2203/142* (2013.01); *Y02P 20/52* (2015.11)

(56) References Cited

U.S. PATENT DOCUMENTS 7,365,102 B1     4/2008     Weissman
7,427,388 B2     9/2008     Garg et al.

PROCESS FOR PRE-REFORMING HYDROCARBON STREAMS CONTAINING OLEFINS, PRE-REFORMING CATALYST AND A PROCESS FOR PREPARING SAID CATALYST

CROSS REFERENCE TO RELATED APPLICATIONS

This application is a National Stage of International Application No. PCT/BR2014/000162 filed May 16, 2014, claiming priority based on Brazilian Patent Application No. 10 2013 016055-5, filed Jun. 24, 2013, the contents of all of which are incorporated herein by reference in their entirety.

FIELD OF THE INVENTION

The present invention relates to a process for pre-reforming hydrocarbons, more specifically, to a catalytic process to pre-reform hydrocarbons in the presence of steam and absence of oxygen, a catalyst to produce hydrogen through the steam reforming of gaseous hydrocarbon streams and a process for the manufacture of said catalyst.

BACKGROUND OF THE INVENTION

Hydrogen or hydrogen-rich gases are produced on a large scale for use in the refining industry, and in the manufacture of ammonia, methanol and liquid hydrocarbons using the Fischer-Tropsch process. It is also used in numerous hydrogenation and petrochemical processes.

Hydrogen and the gases rich in hydrogen and carbon monoxide, a mixture known as syn (or synthesis) gas, are currently manufactured on an industrial scale, especially through steam reforming. The main reactions that take place in the steam reforming process are represented below (reactions 1, 2 and 3):

$C_nH_m + nH_2O = nCO + (n+\frac{1}{2}m)H_2$ (Endothermic Reaction)  Reaction 1.

$CH_4 + H_2O = CO + 3H_2$ (Endothermic 206.4 kj/mol)  Reaction 2.

$CO + H_2O = CO_2 + H_2$ (Exothermic, −41.2 kj/mol)  -Reaction 3.

The process of steam reforming may have diverse configurations, depending on the type of load and the desired use of the hydrogen-rich gas that will be produced. Such configurations may include a pre-reforming reactor, this option being particularly advantageous when the unit uses naphtha or different proportions of naphtha and natural gas as feedstock, when one wants to limit the amount of steam exported in the process, or when one would like to work with a low steam/carbon ratio. It is particularly useful when one wishes to obtain a hydrogen-rich stream with CO contents suitable for use in the manufacture of liquid hydrocarbons using the Fischer-Tropsch process.

The pre-reforming step is normally conducted in a fixed bed reactor with a nickel-based catalyst, under typical temperature conditions of between 350° C. and 550° C., a steam/carbon ratio of between 1 and 5, and a pressure of up to 40 bar.

The literature teaches us that nickel-based pre-reforming catalysts are subject to deactivation due to coke formation, which reduces catalyst activity and leads to high load losses in the industrial reactor.

Carbon may be formed on pre-reforming catalysts via one or more of the following reactions:

$C_nH_m = nC + (m/2)H_2$  Reaction 4.

$CH_4 = C + 2H_2$  Reaction 5.

$2CO = C + CO_2$  Reaction 6.

According to the literature, carbon may be formed via hydrocarbon cracking reactions (reactions 4 and 5), and/or by CO disproportionation, depositing carbon atoms on the surface of the catalyst that are coke precursors, which in turn may encapsulate the active surface or produce carbon filaments on the metal particles. The formation of carbon filaments in particular can result in a large amount of carbon on the catalyst, potentially leading to its fragmentation. Both phenomena contribute to high levels of load loss in industrial reactors.

A known technique to reduce the problems associated with the phenomenon of coking of pre-reforming catalysts is to select the operating variables, in particular the steam/carbon and hydrogen/load ratios and the temperature, so that it is possible to operate at a temperature range such that, at temperatures above the maximum recommended temperature, coking known as filament or whisker coke occurs, and at temperatures below the minimum recommended temperature, coke is formed by the deposition of gum on the catalyst.

Although selecting the operating variables contributes to reducing the rate of formation of coke in pre-reforming reactors, the literature shows that coke accumulation is subject to the so-called kinetic regimen, where it can accumulate on the catalyst when its rate of formation exceeds the rate of gasification of the coke-forming species. Thus, coke may deposit on the catalyst even when the thermodynamic equilibrium would not predict its formation.

Factors that contribute to a higher rate of formation of coke on pre-reforming catalysts are known in the literature, and involve the use of low steam/carbon ratios, low hydrogen/load ratios, and the type of feedstock used. Considering feedstock, it is known in the state of the art that hydrocarbons in the naphtha range have a greater tendency to deposit carbon than natural gas. Among other factors contributing to coke formation, the literature shows that the presence of olefins is one of the most important factors, and can greatly accelerate the accumulation of coke on pre-reforming catalysts.

Techniques to reduce the effects of coke deactivation of pre-reforming catalysts are known to the state of the art.

U.S. Pat. No. 3,481,722 (1969, Engelhard) discloses a process for steam reforming a liquid hydrocarbon stream by contacting the hydrocarbon feed with steam and hydrogen with a catalyst containing a platinum group metal, at temperatures below 700° C. This solution however, of replacing nickel-based catalysts with a noble-metal based catalyst in the pre-reforming process, has high costs in terms of catalyst use, which limits its use for the large-scale manufacture of hydrogen or syn gas.

According to the literature, the use of alkali metals such as potassium in steam reforming or pre-reforming reduces the rate of coke deposit (Applied Catalysis A: General, 187 (1999) 127-140; Applied Catalysis, 287 (2004), 169-174). According to this disclosure, it is known that commercially available pre-reforming catalysts may contain varying amounts of alkali metals, such as potassium. The addition of alkaline compounds has an inconvenience in that they reduce the steam reforming activity of nickel-based catalysts, requiring that specific methods be adopted to obtain a steam reforming catalyst that incorporates alkali metals without harming their steam reforming activity, as disclosed in PI 1000656-7 A2 (2010 PETROBRAS).

Applied Catalysis, 31 (1987) pages 200-207 discloses a method to prepare a Ni/Al2O3—MgO—NiO type catalyst that has good resistance to carbon deposition, by coprecipitation. However, this catalyst is difficult to reduce, with a reduction level of around 50% at 500° C., which was associated with the formation of NiO—MgO solid solutions.

The literature shows that NiO—MgO phases can be formed that are only reduced when exposed to hydrogen at temperatures on the order of 800° C. to 850° C. (Applied Catalysis, 28 (1988) 365-377), temperatures that cannot be reached in a typical industrial pre-reforming reactor. This behavior results in the non-utilization of a significant phase of the Ni present in the catalyst, or the adoption of catalyst pre-reduction and passivation. It is known that commercially available pre-reforming catalysts containing magnesium in their formulation are often sold in the pre-reduced form, resulting in additional costs and handling precautions to avoid oxidation. It is also known in industrial practice that commercially available catalysts containing a free MgO phase must be carefully warmed in the absence of steam to avoid hydration of the MgO phase, which can lead to breaking the catalyst and an increase in load loss.

U.S. Pat. No. 7,427,388 (2008, Air Products) discloses a process for pre-reforming natural gas containing hydrocarbons larger than methane, which includes contacting steam, hydrogen and natural gas containing hydrocarbons larger than methane with a nickel-based catalyst, with an oxygen content that is less than the amount required to partially oxidize the hydrocarbons.

The addition of oxygen contributes to increasing the lifetime of the pre-reforming catalyst.

The addition of oxygen to the pre-reforming process implies additional manufacturing costs and/or the cost to purify the gas produced if air is used as the source of oxygen. There may also be technical limitations for its use in existing units, due to the high temperatures that may potentially exist in the process from the addition of oxygen.

According to the literature, olefins are a class of hydrocarbon that largely favor the formation of coke on steam pre-reforming or reforming catalysts.

In refineries, a typical stream containing olefin is refinery gas, which may be used to manufacture hydrogen or syn gas by steam reforming, so long as properly purified to remove sulfur compounds and olefins.

Olefin removal is normally performed in the pre-treatment section of the steam reforming unit, and typically involves the use of a reactor containing a NiMo/Alumina type catalyst, preferably in the sulfided state, and a high flow of recycled hydrogen, so as to provide the hydrogen required to saturate the olefins and control the reaction temperature due to the heat released by the exothermic olefin hydrogenation reactions. Such olefin removal processes, though efficient, are high cost in terms of the investment in the reactor, catalyst and compressors to recycle hydrogen.

Olefins may also be present in the tail gas of Fischer-Tropsch streams recycled to the pre-reforming section of the steam reforming unit. Typically, after undergoing a separation process for the removal of olefins and longer-chain oxygenated products, the gaseous effluent of a Fischer-Tropsch unit contains methane, ethane and carbon dioxide, in addition to unreacted hydrogen and carbon monoxide. However, often one observes olefins such as ethylene in this gas, due to the difficulty of purifying the stream using conventional techniques. As shown in the examples, commercially available pre-reforming catalysts are subject to rapid coking due to the presence of olefins in the feed, leading to a reduction in steam reforming activity and an increase in load loss in the pre-reforming reactor, and can lead to early pre-reforming reactor stops to replace the catalyst load.

Thus, although the technical literature contains numerous citations and descriptions, there is a need to provide a process that discloses the use of pre-reforming catalysts that resist coke deposition, especially for use with olefin containing streams.

The catalyst of the present invention may be used in the pre-reforming step of technologies to transform natural gas into syn gas in a first step, and then into liquid hydrocarbons, as an option for using the natural gas associated with crude oil in an FPSO (Floating Production Storage and Offloading) type rig. Such processes are currently being developed, with one of the challenges to be solved for their use on a larger, industrial scale being how to recycle streams containing light hydrocarbons formed in the Fischer-Tropsch section in the hydrogen producing section. Such recycling would enable a higher overall yield of the liquid products desired from the process in relation to the feedstock used, as well as adjusting the H2:CO ratio required for the "Fischer-Tropsch" section.

In practice, however, such recycling may compromise the lifetime of the catalyst in the pre-reforming section of the syn gas generation process, due to higher load losses due to coking, the result of olefins in the recycle stream. A technical solution that may be adopted is to replace the nickel-based catalyst of the pre-reforming section for producing hydrogen by a noble metal based catalyst. This solution, although it reduces any increase in load loss in the unit, has the inconvenience of employing a high cost, noble metal-based catalyst, making it difficult to enable the large scale, industrial use of this type of technology.

The present invention discloses the preparation of a nickel-based natural gas pre-reforming catalyst that is resistant to deactivation by coking due to the presence of olefins in the natural gas, or in the recycle gas from processes such as Fischer-Tropsch, which is added together with the steam and natural gas. Such a solution may be adopted to reduce the problems associated with high load losses during pre-reforming of olefin-containing gases, at a lower cost than the solution using noble metal based catalysts.

In addition to its use in technology to manufacture syn gas and Fischer-Tropsch products on an FPSO type rig, as an option for using the associated natural gas, the present invention may also be used in conventional processes for onshore manufacture of hydrogen and syn gas that include pre-reforming reactors in their process configuration, with the potential benefit of extending run times by reducing coking.

SUMMARY OF THE INVENTION

The present invention relates to a process for pre-reforming hydrocarbons, a catalyst for the manufacture of hydrogen by steam reforming of hydrocarbons, and a process for its manufacture, said pre-reforming catalyst containing an inorganic oxide support, oxides of Ni, La and Ce in ratios of 6:1 (w/w) to 15:1 (w/w) of NiO to $La_2O_3$, and 2:1 (w/w) to 4:1 (w/w) of $Ce_2O_3$ to $La_2O_3$, and a total NiO content of between 4% (w/w) and 50% (w/w).

C1=—□—
C2=—○—
C3=—▲—
Example 2=—●—

Figure 2:
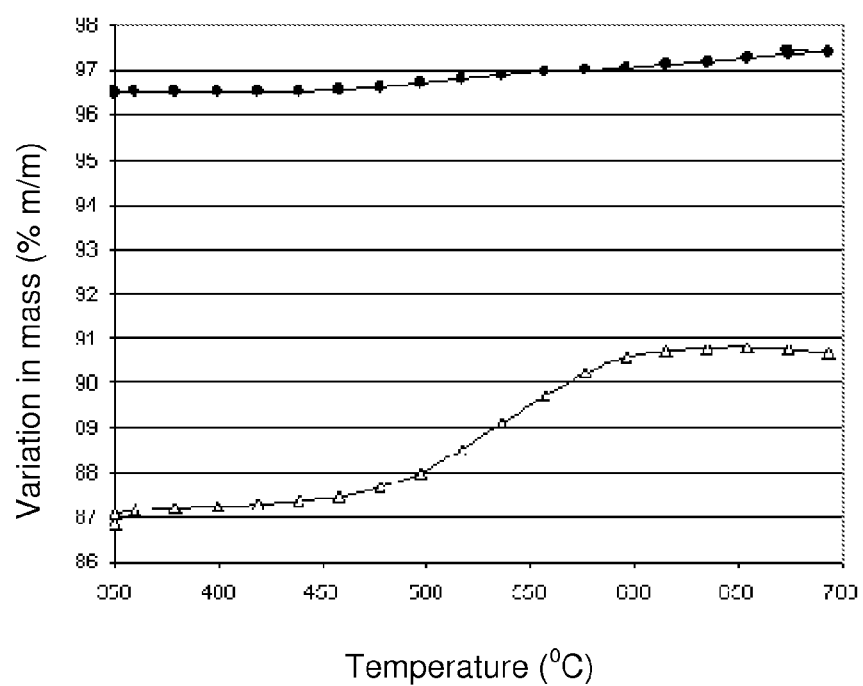

FIG. 2 is a schematic showing the rate of carbon deposition on a catalyst according to the present invention (example 2), and a commercially available nickel-based pre-reforming catalyst according to state of the art, using an olefin-containing gas stream with a high carbon monoxide content.

Figure 3:
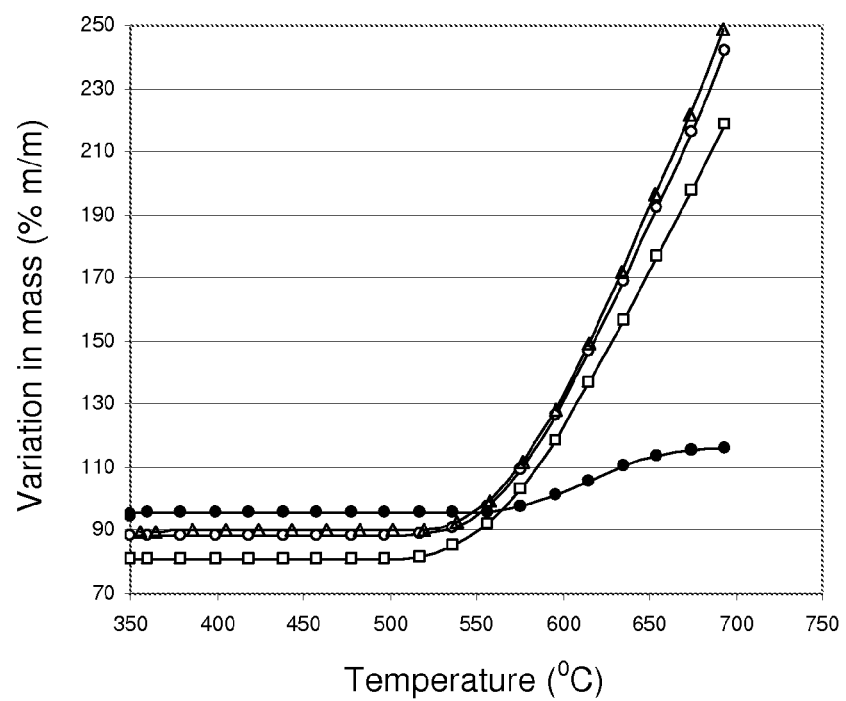

FIG. 3 is a schematic showing the rate of carbon deposition on commercial, nickel-based pre-reforming catalysts and on the catalyst prepared in example 2.

DETAILED DESCRIPTION OF THE INVENTION

The present invention relates to a pre-reforming catalyst consisting of:
- an inorganic oxide support, preferably comprised of alumina, magnesium aluminate, calcium aluminate or a mixture thereof;
- oxides of Ni, La and Ce in a proportion of 6:1 (w/w) to 15:1 (w/w) of $NiO:La_2O_3$ and $Ce_2O_3:La_2O_3$ in a proportion of 2:1 (w/w) to 4:1 (w/w); and
- a total content of NiO between 4% w/w and 50% w/w, preferably between 7% w/w and 30% w/w.

Optionally, the support may contain between 0.1% and 10%, preferably between 1% and 5% of alkali metals, preferably potassium.

The catalyst of the present invention is prepared from a low surface acidity inorganic oxide, selected preferably from among the group comprised of alumina, calcium aluminate, magnesium aluminate or a combination thereof. The support particles may be in various forms suitable for industrial use in steam reforming, such as extrudates, spheres, cylinders with a central hole (Rashing rings) or cylinders with multiple holes.

The present invention also relates to a process to prepare a supported nickel-based catalyst for use in pre-reforming of olefin-containing gases, made up of the following steps:
1) Preparing a solution, preferably an aqueous solution, of an inorganic salt of nickel, preferably nitrate, acetate or carbonate, containing a soluble salt of lanthanum and cerium, preferably in the form of nitrates;
2) Impregnating the inorganic oxide support using techniques known as pore volume (wet-point) or by the method of excess solution;
3) Drying the inorganic oxide material impregnated with a solution containing nickel in air, at temperatures between 50° C. and 140° C. for 1 to 24 hours;
4) Calcining the impregnated inorganic oxide material in static air or in a flow of air between 350° C. and 650° C. for 1 to 4 hours.

Optionally, steps (2 to 4) may be repeated more than once to achieve the desired content of NiO on the support.

The calcining in step 4 may be replaced by direct reduction in the presence of a flow of reducing agent.

Convenient reducing agents may be selected from, but are not limited to hydrogen, ammonia, formaldehyde or methanol, optionally in the presence of steam, at temperature conditions between 300° C. and 800° C. for 1 to 5 hours, followed by cooling and preferably being submitted to an air flow at a temperature of between 20° C. and 60° C. for 1 to 5 hours, to avoid any pyrophoric nature of the material when handled.

The impregnating solution in step 1 may also include compounds to control the pH, increase the solubility or avoid phase precipitation. Non-limiting examples of these compounds are nitric acid, sulfuric acid, phosphoric acid, boric acid, ammonium hydroxide, ammonium carbonate, hydrogen peroxide, sugars or combinations thereof.

The catalyst of the present invention is prepared from an inorganic oxide support, preferably using the wet-point impregnation method. This process consists of contacting the support and a volume of solution, preferably an aqueous solution, of nickel, lanthanum and cerium salts, sufficient to completely fill the pores of the support. Preferably, the solvent of the impregnation solution is water, alcohols such as methanol or ethanol, or combinations thereof.

Optionally, the support may contain between 0.1% and 10%, preferably between 1% and 5% of alkali metals, preferably potassium The alkali metal maybe introduced to the support before or during the steps of impregnation with the nickel salt solution.

The catalyst may be used 100% in the pre-reforming reactor, or preferably be placed in the top of the reactor in a proportion relative to the total bed of 10% to 70%, more preferably between 20% and 40% by volume.

Catalysts prepared in this way may be used to produce a gas rich in methane and hydrogen, free of other hydrocarbons, at pressures between 1 kgf/cm to 50 kgf/cm and temperatures between 300° C. and 650° C., from a mixture of steam and hydrocarbons, preferably containing hydrogen, characterized by the hydrocarbon stream preferably containing olefins.

Preferably, the catalyst can be placed in the upper section of the reactor when followed by a commercially available nickel-based catalyst, or in the lower section when preceded by a noble metal based catalyst.

The gas thus generated may be used directly as synthetic natural gas, for use as fuel, or after conveniently purified, as feed for fuel cells. The gas thus generated may be used in steam reforming processes to manufacture hydrogen or syn gas.

The present invention further relates to a catalytic hydrocarbon pre-reforming process in the presence of steam and absence of oxygen, where the hydrocarbon stream contains between 0.1% and 5%, preferably between 0.2% v/v and 2% v/v, expressed on a dry basis, of suitable olefins, which are refinery gas streams or streams from Fischer-Tropsch processes.

The steam/carbon ratio at the entrance to the reactor containing the catalyst is between 0.1 mol/mol and 5 mol/mol, preferably between 1 mol/mol and 3 mol/mol. The $H_2$/hydrocarbon ratio is between 0.03 mol/mol and 0.6 mol/mol, preferably between 0.05 mol/mol and 0.4 mol/mol.

The catalyst may be used 100% in the pre-reforming reactor, or when combined with other catalyst, preferably be placed in the top of the reactor in a proportion relative to the total bed of 10% to 70%, more preferably between 20% and 40% by volume.

The catalyst can be placed in the upper section of the reactor when followed by a commercial, nickel-based catalyst, or in the lower section when preceded by a noble metal based catalyst.

Catalysts prepared in this way may be used to produce a gas rich in methane and hydrogen, free of other hydrocarbons, at pressures between 1 kgf/cm and 50 kgf/cm and temperatures between 300° C. and 650° C., from a mixture of steam and hydrocarbons containing hydrogen, where the hydrocarbon stream preferably contains olefins.

The gas thus generated may be used as synthetic natural gas, as fuel or as feed for fuel cells.

In particular, the gas thus generated may be used in steam reforming processes to manufacture hydrogen or syn gas.

EXAMPLES

The following examples are provided to illustrate more fully the nature of the present invention and how it is practiced. Examples should not be considered to limit the more general embodiments described herein.

Example 1

This example illustrates the preparation of a catalyst according to the present invention, based on nickel, lanthanum and cerium on an alumina-type support. 100 g of theta-alumina (Axens SPH 508F with a pore volume of 0.7 cm$^3$/g, in the form of 3 mm to 4 mm diameter spheres) were impregnated with 70 ml of an aqueous solution containing 2.95 grams of La(NO$_3$)$_3$.6H$_2$O; 8.82 g of Ce(NO$_3$)$_3$.6H$_2$O, and 33.03 g of Ni(NO$_3$)$_2$.6H$_2$O. This material was dried at 60° C. for 2 hours, warmed in static air from 60° C. to 120° C. at a rate of 1° C./min, and then to 250° C., at a rate of 1.4° C./min.

The catalyst was then calcined at 450° C. for 4.5 hours to yield a catalyst of the type Ni—Ce—La/theta-alumina containing 7.6% (w/w) of NiO, 1.0% (w/w) of La$_2$O$_3$ and 3.0% w/w of Ce$_2$O$_3$.

Example 2

This example illustrates the preparation of a catalyst according to the present invention. The catalyst was prepared in an identical way as in example 1, except that that the 450° C. calcining step was not performed. Instead, a reduction step was performed in a hydrogen flow, with the temperature program going from 20° C. to 730° C., at a rate of 1.5° C./min. Following reduction, the catalyst was cooled to ambient temperature in a flow of hydrogen, and then purged with a nitrogen flow and exposed to a flow of synthetic air to passivate the metallic nickel phase formed during the reduction process.

Example 3

This example illustrates the preparation of a catalyst according to the present invention, based on nickel, lanthanum and cerium on a magnesium aluminate type support. Initially a K promoted magnesium aluminate support was prepared. 300 g of commercial hydrotalcite (SudChemie CDS T-2701 1/16" containing 30% MgO, the balance being alumina) were impregnated with 300 ml of an aqueous solution containing 11.06 g of KOH. The material was then calcined at 1,050° C. for 4 hours to yield a material with the crystalline structure of magnesium aluminate and containing a nominal 3% of K$_2$O. The Ni, Ce and La phases were introduced by impregnating 250 g of the magnesium aluminate type support with 216 ml of a solution containing 7.38 g of La(NO$_3$)$_3$.6H$_2$O, 22.05 g of Ce(NO$_3$)$_3$.6H$_2$O and 82.58 g of Ni(NO$_3$)$_2$.6H$_2$O. The material was dried at 60° C. for 2 hours, heated in static air from 60° C. and 120b° C. at a rate of 1° C./min, and then to 250° C. at a rate of 1.4° C./min. The catalyst was then pre-reduced by treating in a flow of hydrogen at a temperature program of 20° C. to 730° C. at a rate of 1.5° C./min. After reduction, the catalyst was cooled to ambient temperature in a flow of hydrogen, and then purged with a nitrogen flow and exposed to synthetic air to passivate the metal nickel phase formed during the reduction process, yielding a catalyst containing 6.0% Ni, 1.0% (w/w) La$_2$O$_3$ and 3.0% (w/w) Ce$_2$O$_3$% supported on potassium promoted magnesium aluminate.

Example 4

This example, in accordance with state-of-the art, illustrates the resistance to carbon deposition under conditions of pre-reforming a gas stream containing hydrocarbons, a high content of carbon monoxide and no olefins over commercially available, nickel-based pre-reforming catalysts identified as C1, C2 and C3.

The catalysts were tested in a TGA/SDTA851 E thermogravimetric analyzer (Mettler Toledo TGA). Tests were performed using 25 mg of catalyst ground to less than 170 mesh. An initial pre-treatment step was performed by passing 40 mL/min of a mixture containing 10% (v/v) hydrogen in argon saturated with steam at 15° C. and 40 mL/min of nitrogen (protection gas), with a temperature programming going from 100° C. to 650° C. at a rate of 10° C./min, maintaining this temperature for 1 hour. The temperature was then reduced to 350° C. and measurements made of the rate of coke formation by replacing the H$_2$/Argon stream with a synthetic stream comprised of 21.5% hydrogen, 27.3% CO, 42.9% CO$_2$ and 8.3% CH$_4$ saturated with steam at 15° C., with a temperature programming of 350° C. to 700° C. at a rate of 5° C./min. The results of carbon deposition are presented in FIG. 1 as an increase in mass versus temperature. In this type of experiment, catalysts with low resistance of carbon deposition presented a significant increase in mass over time (or temperature) during the experiment.

Figure 1:
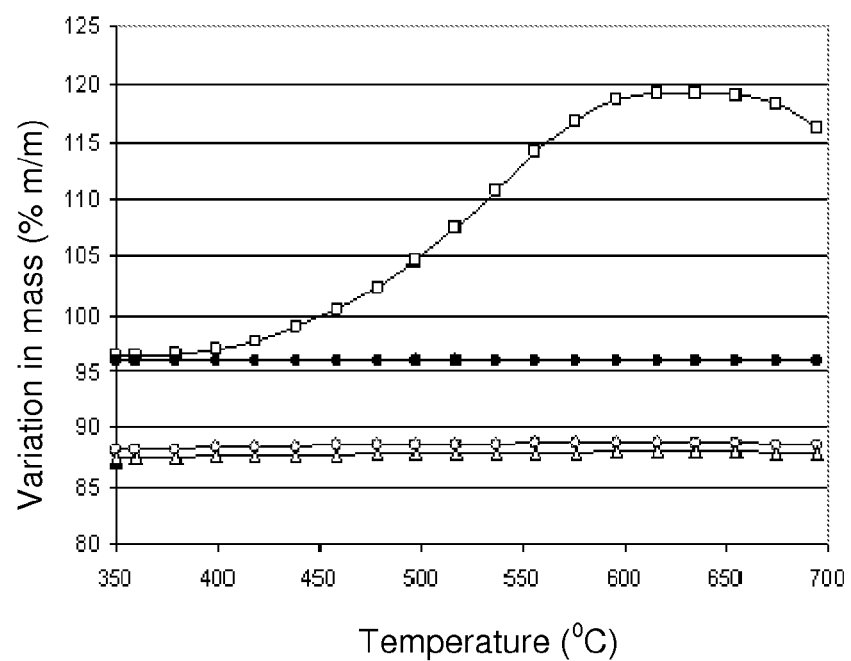
FIG. 1 is a schematic showing the rate of carbon deposition on commercially available nickel-based pre-reforming catalysts according to state of the art, and on the catalyst prepared in example 2, using an olefin-free gas stream with a high carbon monoxide content. Where.

FIG. 1 shows that it is possible, according to state of the art and using commercially available catalysts, to achieve a low rate of coking with a gas rich in carbon monoxide, but free of olefins. Two (C1 and C2) of the four commercially available catalysts tested showed high rates of carbon deposition, which may be associated with low resistance to carbon deposition due to the "Boudoard" reaction: $2CO=C+CO_2$, which is thermodynamically favored under the experiment conditions. The catalyst according to the present invention (Example 2) shows high stability and no signs of carbon deposition under the experimental conditions adopted.

As shown in examples 5 and 6, commercially available nickel catalysts, according to the state-of-the-art, perform poorly in the presence of an olefin-rich gas, presenting high rates of coking. On the other hand, pre-reforming catalysts prepared according to the present invention enable obtaining high levels of steam reforming activity with high levels of resistance to coking.

FIG. 1 refers to the carbon deposition rate on state-of-the-art commercially available nickel-based pre-reforming catalysts using an olefin-free gas with a high content of carbon monoxide. The composition of the reaction gas was 21.5% hydrogen, 27.3% CO, 42.9% CO$_2$ and 8.3% CH$_4$, and a steam/reaction gas ratio of 0.012 mol/mol.

Example 5

This example illustrates the high resistance to carbon deposition of a pre-reforming catalyst prepared according to the present invention, compared to a commercially available state-of-the art catalyst under pre-reforming conditions with a gas stream containing hydrocarbons and a high content of carbon monoxide, in the presence of olefins. The experiments were conducted in a manner similar to that in Example 4, except for the composition of the reaction gas. The gas composition used was 21.0% hydrogen; 27.0% CO, 42.0% $CO_2$, 8.0% $CH_4$, and 2% ethylene.

Comparing the results shown in FIGS. 1 and 2, we see that the presence of olefins causes carbon to deposit on commercially available pre-reforming catalyst C3 (FIG. 2), which had demonstrated an excellent performance in the absence of olefins, with no signs of carbon deposition (FIG. 1). In comparison, the catalyst according to the present invention (Example 2) performs better than the state-of-the-art materials, showing a lower rate of carbon deposition, even in the presence of high contents of carbon monoxide and olefins.

FIG. 2 refers to the carbon deposition rate on a catalyst according to the present invention (Example 2) and a state-of-the-art commercially available nickel-based pre-reforming catalyst using a gas with a high content of olefins and carbon monoxide. The composition of the reaction gas was 21.0% hydrogen, 27.0% CO, 42.0% $CO_2$, 8.0% $CH_4$ and 2% ethylene, and a steam/reaction gas ratio of 0.012 mol/mol.

Example 6

This example illustrates the high resistance to carbon deposition of a pre-reforming catalyst prepared according to the present invention, compared to state-of-the-art commercially available nickel-based pre-reforming catalysts, under pre-reforming conditions with a gas stream containing hydrocarbons and a high content of carbon monoxide, in the presence of olefins, simulating a typical recycling stream from Fischer-Tropsch processes. The experiments were conducted in a manner similar to that in Example 4, except that the gas composition was 21.9% hydrogen, 13.2% CO, 15.9% $CO_2$, 43.62% $CH_4$, 1.77% nitrogen and 0.20% ethylene.

FIG. 3 refers to the rate of carbon deposition on commercially available nickel-based pre-reforming catalysts. The composition of the reaction gas was 21.9% hydrogen, 13.2% CO, 15.9% $CO_2$, 43.62% $CH_4$, 1.77% nitrogen and 0.20% ethylene, and a steam/reaction gas ratio of 0.012 mol/mol.

The examples in FIGS. 1, 2 and 3 show that the catalyst prepared according to the present invention, containing cerium and lanthanum Ni-promoted Ni supported on alumina (Example 2) is capable of exhibiting high resistance to carbon deposition with a wide range of typical compositions of steam pre-reforming gas streams containing olefins.

Example 7

This example shows that the catalysts of the present invention have high steam reforming activity and low carbon deposition rates, even with a metal (nickel) content far lower than that used in state-of-the-art, commercially available pre-reforming catalysts.

The steam reforming activity was determined using commercial AutoChem II (Micrometrics) equipment.

Tests were performed using 200 mg of catalyst ground to less than 170 mesh. An initial activation step was performed at 650° C. and ambient pressure for two hours, by passing a 30 mL/min of a mixture containing 10% $H_2$/argon saturated with steam at 40° C. over the catalyst. The purpose of activation is to obtain an active phase of nickel metal. Following activation, the steam reforming reaction was undertaken by passing a stream of 21.9% hydrogen; 13.2% CO, 15.9% $CO_2$ 43.62% $CH_4$, 1.77% nitrogen and 0.20% ethylene saturated with steam at 40° C., at a reaction temperature of 450° C. The gases coming out of the reactor were analyzed by mass spectrometry and activity measured as the rate of conversion of methane.

Table 1 shows the results of catalytic activity and illustrates that one may obtain high steam reforming activity with the catalysts of the present invention, which is particularly important given the low content of nickel used in formulating the catalyst, and the absence of noble metals, factors that contribute to a lower cost to manufacture the catalyst according to the present invention. The coking rate was determined as described for example 4, using a recycling stream typical of Fischer-Tropsch processes, comprised of 21.9% hydrogen, 13.2% CO, 15.9% $CO_2$, 43.62% $CH_4$, 1.77% nitrogen, and 0.20% ethylene. The coking rate (mg coke/mg catalyst×min) was determined by the slope of the variation in mass versus time curves.

TABLE 1

Steam reforming activity and rate of coke deposition under pre-reforming conditions. State of the art Ni based pre-reforming catalysts (C1, C2 and C3), and a commercially available noble metal based catalyst (CMN1).

| Catalyst | Type | Methane conversion (% v/v) GHSV = 18,000 $h^{-1}$ | Coking rate mg coke/ (mg cat × min) |
|---|---|---|---|
| C1 | Commercially available Ni based pre-reforming | 26.0 | 5.0 |
| C2 | Commercially available Ni based pre-reforming | 21.4 | 5.6 |
| C3 | Commercially available Ni based pre-reforming | 33.3 | 5.9 |
| CMN1 | Commercially available noble metal based | 9.8 | 0.01 |
| EXAMPLE 1 | 6Ni3Ce1La/alumina | 15.4 | 0.59 |
| EXAMPLE 2 | 6Ni3Ce1La-alumina | 17.2 | 0.11 |
| EXAMPLE 3 | 6Ni3Ce1La—Mg/K aluminate | 14.3 | 0.88 |

The results presented in table 1 demonstrate that the catalysts of the present invention enable obtaining high steam reforming activity, twice that found with a metal noble based pre-reforming catalyst, while at the same time they have a low coking rate, which is only lower than that of a commercially available noble metal based catalyst, which however has a high cost of production, making it difficult to enable its industrial use on a large scale.

The results of Table 1 further show that it is advantageous to conduct the final step of catalyst preparation according to the present invention, using a reduction step rather than calcining. The pre-reduced catalyst of the present invention (Example 2) shows higher activity and a lower rate of coking than the oxidized catalyst (Example 1).

The results shown in the examples above clearly demonstrate that the present invention is well adapted to achieving the desired objectives with the advantages mentioned, which shall not constitute a limitation to the content thereof. It will be apparent to those skilled in the art that various changes and modifications can be made to this invention as claimed and described herein, without departing from the spirit and scope thereof.

The invention claimed is:

1. A process for pre-reforming olefin containing hydrocarbon streams, comprising:
   pre-reforming an olefin-containing hydrocarbon stream in the presence of a pre-reforming catalyst and steam and in the absence of oxygen,
   wherein the content of olefins in the stream in relation to the hydrocarbon is 0.1% v/v to 5.0% v/v, the content of steam compared to carbon is 0.1 mol/mol to 5.0 mol/mol, and the content of $H_2$/hydrocarbon is 0.03 mol/mol to 0.6 mol/mol,
   wherein the pre-reforming catalyst comprises an inorganic oxide support and oxides of Ni, La and Ce, and
   wherein, in the pre-reforming catalyst, the ratio of NiO to $La_2O_3$ is 6:1 (w/w) to 15;1 (w/w), the ratio of $Ce_2O_3$ to $La_2O_3$ is 2:1 (w/w) to 4:1 (w/w), and the total content of NiO is 4.0% w/w to 50% w/w.

2. The process for pre-reforming olefin containing hydrocarbon streams according to claim 1, characterized by the olefin content relative to the hydrocarbon being 0.2% v/v to 2.0% v/v.

3. The process for pre-reforming olefin containing hydrocarbon streams according to claim 1, characterized by the steam content relative to carbon being 1.0% v/v to 3.0% v/v.

4. The process for pre-reforming olefin containing hydrocarbon streams according to claim 1, characterized by the $H_2$/hydrocarbon content being 0.05 mol/mol to 0.4 mol/mol.

5. The process for pre-reforming olefin containing hydrocarbon streams according to claim 1, characterized by the hydrocarbon stream having a pressure of between 1 kgf/cm to 50 kgf/cm, and a temperature of between 300° C. and 650° C.

6. The process for pre-reforming olefin containing hydrocarbon streams according to claim 1, characterized by the inorganic oxide being a low surface acidity oxide selected from the group consisting of alumina, magnesium aluminate, calcium aluminate and a mixture thereof.

7. The process for pre-reforming olefin containing hydrocarbon streams according to claim 1, characterized by the support further containing a content of alkali metals of 0.1% to 10%.

8. The process for pre-reforming olefin containing hydrocarbon streams according to claim 1, characterized by the total content of NiO being 7% to 30% w/w.

9. The process for pre-reforming olefin containing hydrocarbon streams according to claim 1, characterized by the support containing a content of alkali metals of 1% and 5%.

10. The process for pre-reforming olefin containing hydrocarbon streams according to claim 1, characterized by the pre-reforming taking place in the presence of a nickel-based catalyst in addition to the pre-reforming catalyst.

* * * * *